US012264850B2

(12) United States Patent
Vouillamoz et al.

(10) Patent No.: US 12,264,850 B2
(45) Date of Patent: Apr. 1, 2025

(54) GEOTHERMAL HEAT EXCHANGE INSTALLATION AND METHOD

(71) Applicant: EAPOSYS SA, Biel/Bienne (CH)

(72) Inventors: Lucien Vouillamoz, Feusisberg (CH); Naomi Vouillamoz, Biel/Bienne (CH); Alain Jaccard, Sainte-Croix (CH)

(73) Assignee: EAPOSYS SA, Biel/Bienne (CH)

( * ) Notice: Subject to any disclaimer, the term of this patent is extended or adjusted under 35 U.S.C. 154(b) by 538 days.

(21) Appl. No.: 17/418,292

(22) PCT Filed: Dec. 30, 2019

(86) PCT No.: PCT/IB2019/061438
§ 371 (c)(1),
(2) Date: Jun. 25, 2021

(87) PCT Pub. No.: WO2020/141437
PCT Pub. Date: Jul. 9, 2020

(65) Prior Publication Data
US 2022/0128269 A1 Apr. 28, 2022

Related U.S. Application Data

(60) Provisional application No. 62/786,601, filed on Dec. 31, 2018.

(51) Int. Cl.
*F24T 10/10* (2018.01)
*F03G 7/04* (2006.01)
*F24T 10/20* (2018.01)

(52) U.S. Cl.
CPC .............. *F24T 10/10* (2018.05); *F03G 7/04* (2013.01); *F24T 10/20* (2018.05)

(58) Field of Classification Search
CPC . F24T 10/00; F24T 10/10; F24T 10/13; F24T 10/17; F24T 10/20; Y02B 10/10; Y02B 10/40
See application file for complete search history.

(56) References Cited

U.S. PATENT DOCUMENTS 4,051,677 A * 10/1977 Van Huisen ............ F24T 10/20
165/45
6,668,554 B1 * 12/2003 Brown ................ E21B 41/0064
60/641.2
(Continued)

FOREIGN PATENT DOCUMENTS

CN 207 004 743 U 2/2018
CN 107771268 A * 3/2018 .............. F24T 10/10
(Continued)

OTHER PUBLICATIONS

International Search Report, International patent application No. PCT/IB2019/061438, Apr. 15, 2020.
(Continued)

*Primary Examiner* — Miguel A Diaz
(74) *Attorney, Agent, or Firm* — Da Vinci Partners LLC; John Moetteli

(57) ABSTRACT

A geothermal installation for collecting heat for the generation of electricity is provided. The installation includes a fluid transport system comprising at least one fluid injection bore extending from a thermoelectric generator located at or near the Earth's surface to a depth below the Earth's surface sufficient such that energy collected can produce electricity. In particular, a depth of at least 500 m, preferably at least 1500 m, and more preferably at least 3000 m is sufficient to see benefits. The fluid injection bore is connected at the said depth, respectively to a plurality of micro-tunnels which extend outwardly substantially horizontally or diagonally downwardly from a horizontal plane passing through the said depth, preferably interconnected in at least one array. The micro-tunnels in turn are connected with fluid return bores which return a heat transfer fluid to the thermoelectric generator. The fluid transport system is adapted for the flow
(Continued)

therethrough to and from the thermoelectric generator of the heat transfer fluid.

23 Claims, 18 Drawing Sheets

(56) References Cited

U.S. PATENT DOCUMENTS

| | | | | |
|---|---|---|---|---|
| 11,732,929 | B2 * | 8/2023 | Hughes | F24T 10/10 165/45 |
| 2011/0232858 | A1 | 9/2011 | Hara | |
| 2012/0174581 | A1 * | 7/2012 | Vaughan | F24T 10/10 290/40 C |
| 2013/0232973 | A1 * | 9/2013 | McBay | F03G 7/04 165/45 |
| 2015/0101779 | A1 | 4/2015 | Parrella | |
| 2015/0275638 | A1 * | 10/2015 | Wang | E21B 28/00 166/308.1 |
| 2015/0285226 | A1 * | 10/2015 | Archambeau | F03G 7/04 60/641.1 |

FOREIGN PATENT DOCUMENTS

| | | | | |
|---|---|---|---|---|
| CN | 108869208 A | * | 11/2018 | |
| CN | 114542045 A | * | 5/2022 | E21B 43/305 |
| CN | 116368335 A | * | 6/2023 | |
| WO | WO-2006002325 A2 | * | 1/2006 | E21B 43/17 |
| WO | WO-2014125288 A1 | * | 8/2014 | F03G 7/04 |
| WO | 2015132404 A1 | | 9/2015 | |
| WO | WO-2020257917 A1 | * | 12/2020 | E21B 33/10 |

OTHER PUBLICATIONS

Hirschberg, Stefan; Wiemer, Stefan, Burgherr Peter (Eds.) (2015): Energy from the earth. Deep geothermal as a resource for the future? Zurich: VDF Hochschulverlag an der ETH Zurich (TA-Swiss (Series), 62/2015.

* cited by examiner

GEOTHERMAL HEAT EXCHANGE INSTALLATION AND METHOD

CROSS REFERENCE TO RELATED APPLICATIONS

This application claims the benefit of U.S. Provisional Application No. 62/786,601, filed 31 Dec. 2018 the contents of the entirety of which is explicitly incorporated herein by reference and relied upon to define features for which protection may be sought hereby as it is believed that the entirety thereof contributes to solving the technical problem underlying the invention, some features that may be mentioned hereunder being of particular importance.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

The Earth's geothermal resources are theoretically more than adequate to supply humanity's energy needs in the form of heat and electrical power; however only a very small fraction is exploited. Conventional geothermal (hydrothermal) resources require the presence of three main factors: 1) sufficiently high temperatures in the subsurface; 2) the presence of hot, fluid bearing geologic formations or structures; and 3) a sufficiently high transmissivity of the rock to enable the requisite production and re-injection rates of geothermal brines. In order to be enable geothermal generation of electricity where a hydrothermal resource is not available (i.e. use a petrothermal resource), cold fluid is injected into the hot rock that has been previously fractured to provide a large heat exchange area. This is known as Enhanced Geothermal System (EGS). Cold fluid percolates through the engineered subsurface heat exchanger and extracts the heat stored in the solid rock mass. One or more production wells bring the heated fluid back to the surface (Hirschberg et al. 2015). EGS have several drawbacks: 1) the surface created for heat exchange by hydraulic reservoir stimulation (i.e. injecting fluids under high-pressure to create an interconnected fracture network) remains largely uncontrolled in terms of geometry and size and does not necessarily ensure optimal fluid flow rate for industrial exploitation; 2) hydraulic reservoir stimulation is accompanied by induced seismicity and microseisms can grow into larger earthquakes, which represent a danger to the inhabitants on the surface, and ultimately limit the installations' sustainability.

Further disadvantages of fracking include the requirement for extremely high pressures to break up the underground rock, and as a consequence an important part of the liquid which is injected in the bedrock to frack it infiltrates too far and doesn't get recovered.

What is needed is a system capable of optimal extraction of geothermal power at high depth, without requiring the high pressures needed to frack, and without generating earthquakes.

SUMMARY OF THE INVENTION

A geothermal installation for collecting heat for the generation of electricity is provided. The installation includes a fluid transport system comprising at least one fluid injection bore extending from a thermoelectric generator located at or near the Earth's surface to a depth below the Earth's surface sufficient such that energy collected can produce electricity. In particular, a depth of at least 500 m, preferably at least 1500 m, and more preferably at least 3000 m is sufficient to see benefits. The fluid injection bore is connected at the said depth, respectively to a plurality of micro-tunnels which extend outwardly substantially horizontally or diagonally downwardly from a horizontal plane passing through the said depth, preferably interconnected in at least one array. The micro-tunnels in turn are connected with fluid return bores which return a heat transfer fluid to the thermoelectric generator. The fluid transport system is adapted for the flow therethrough to and from the thermoelectric generator of the heat transfer fluid.

Although the opposite circulation is possible, the inlet heat transfer fluid preferably circulates from the access shaft in the center of the tube. It is insulated from the outlet back-flowing heat transfer fluid by insulation pockets in the internal plug structure or piping segment. The outlet heat transfer fluid travels back to the access shaft in direct contact with the host rock and collects the heat stored in the surrounding rock. The fins deployed around the internal plug or piping segment are designed for increased outlet heat transfer fluid dynamics hence supporting better heat-exchange with the surrounding basement rocks. The system of the invention is designed so that the circulating fluid is not in overpressure compared to the host bedrock in order to minimize leakage.

The present invention provides an increased efficiency compared to heat exchange channels of the state of the art. Further, unlike fracking, relatively low fluid pressures are required and the fluid may be recirculated in a closed loop so as to minimize losses.

Contrary to existing systems, the system of the invention doesn't leak, and in reality it can be made fluid-tight, which would allow us to use a fluid different from water. The liberty of choosing another fluid than water allows the choice of a fluid that has better heat transportation characteristics, and that may not have a boiling point when subjected to the range of operating temperatures.

BRIEF DESCRIPTION OF THE DRAWINGS

The attached drawings represent, by way of example, different embodiments of the subject of the invention.

DETAILED DESCRIPTION OF THE PREFERRED EMBODIMENT

The following description is not intended to limit the scope of the invention in any way as it is exemplary in nature, serving to describe the best mode of the invention known to the inventors as of the filing date hereof. Consequently, changes may be made in the arrangement and/or function of any of the elements described in the exemplary embodiments disclosed herein without departing from the spirit and scope of the invention.

The object of the present invention is an array of heat exchange channels allowing a fluid such as water or any other fluid to circulate with optimized fluid dynamics and flow speed, so as to maximize heat transfer from the underground bedrock to the fluid.

Figure 1:
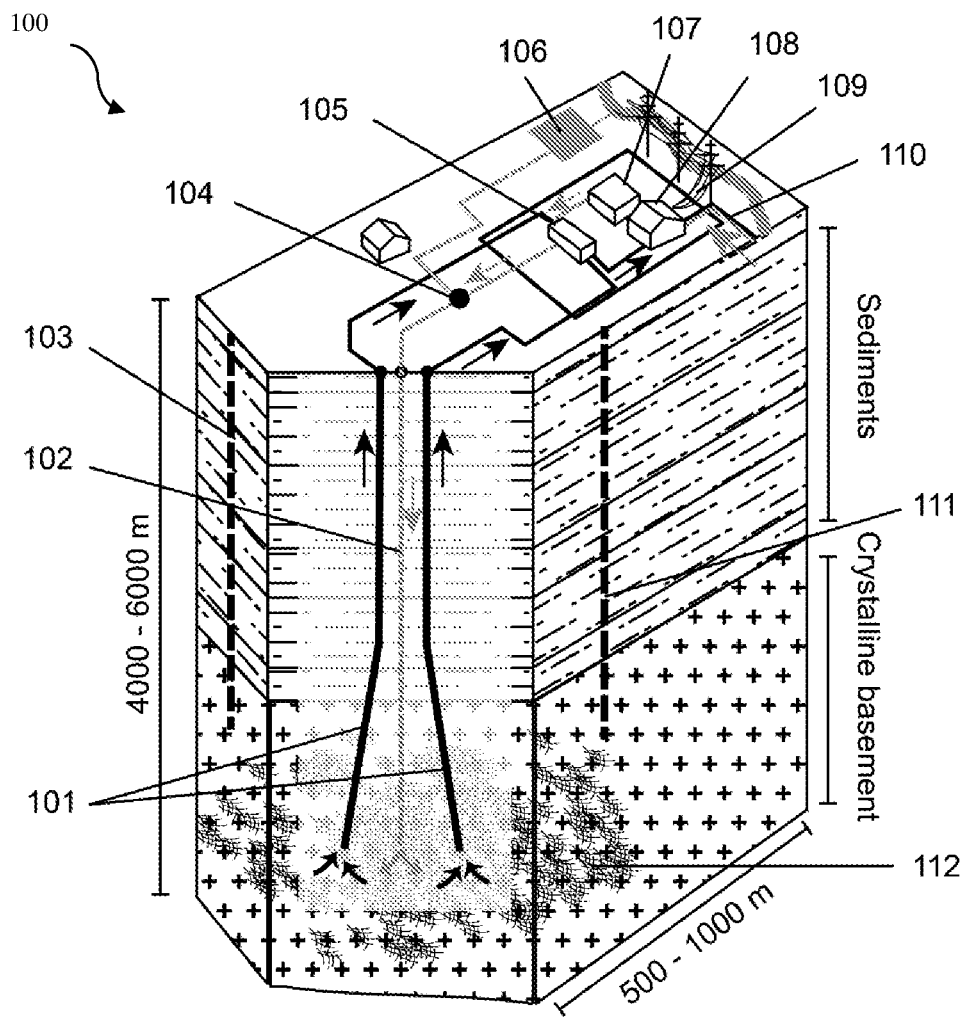
FIG. 1 is a general view of an enhanced geothermal system (adapted from Hirschberg et al. 2015)

In order to harvest the largest possible quantity of thermal energy from the Earth, it is necessary to reach areas where the underground bedrock maintains temperatures higher than 100° C., therefore, considering a mean geothermal gradient of 30° C./km typical for continental areas, deep drilling in depth of typically more than 3'000 m is usually necessary (FIG. 1). The consequences of this situation include the difficulty to extract the excavated materials. Therefore, the system proposed in the current invention aims at extracting a minimal volume of materials from the ground.

Referring now to FIG. 1, an enhanced geothermal system of the prior art (100) adapted from Hirschberg et al. (2015) may present the following elements: Production wells (101); Injection well (102); Research and monitoring well (103); Injection pump (104); Heat exchanger (105); Water reservoir (106); Cooling (107); Turbines (108); Power line (109); District heating (110); Seismic monitoring well (111); and Stimulated reservoir (112).

Note that as used herein, crystalline basement, bedrock, hot bedrock, and underground bedrock refer essentially to the same thing.

Figure 2:
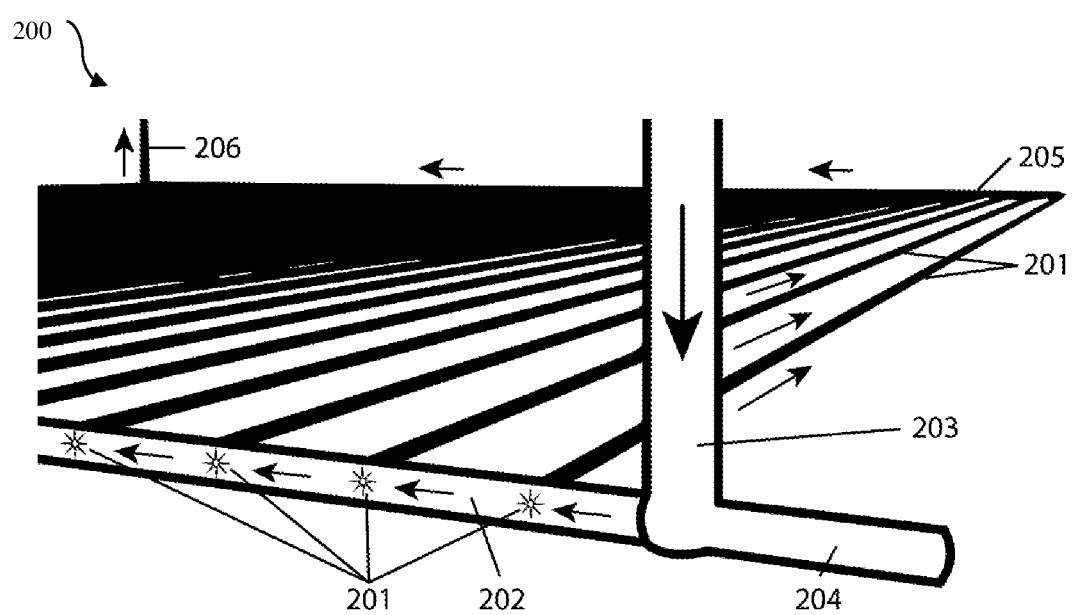
FIG. 2 is a perspective view of an installation according to the invention.

Referring now to FIG. 2, an installation according to the present invention comprises an array 200 of heat exchange channels 201 connected at a first end to the cold fluid distribution channel 202, the cold fluid distribution channel 202 being connected to the cold fluid injection well 203. The cold fluid distribution channel 202 may include fluid tight dry storage volumes 204 for monitoring and control equipment, and/or for drilling and excavation equipment, and/or for maintenance equipment. The second ends of the heat exchange channels (201) are connected to the hot fluid collecting channel 205, the hot fluid collecting channel 205 being connected to the hot fluid extraction well 206. The hot fluid collecting channel 205 may include watertight dry storage volumes (not represented here, but similar to 204) for monitoring and control equipment, and/or for drilling and excavation equipment, and/or for maintenance equipment. The direction of the fluid flow is indicated by arrows.

As the ambient temperature in certain areas of the installation according to the present invention is typically above 100° C., specific cooling systems for monitoring and control equipment, and/or for drilling and excavation equipment, and/or for maintenance equipment may be desirable.

In order to extract sufficient amounts of energy so as the be able to run electrical generators at an industrial performance level, the typical surface area of an array of heat exchange channels according to the present invention should be more than 1'000 m$^2$ and preferably on the order of 6×6 km$^2$. Depending of the heat extraction rate of the installation according to the present invention, the bedrock material surrounding the heat exchange channels 201 may be cooled down to a temperature below that required for efficient heat exchange, in such case only a part of the heat exchange channels 201 that connect the cold fluid distribution channel 202 to the hot fluid collecting channel 205, may be used at a given moment, so as to allow the bedrock material to recover again and again an appropriate temperature for efficient heat exchange, which is usually above 100° C. Usage of only a part of the heat exchange channels (for example, using sections of heat exchange channels situated at different depth zones at different times) may also be made for maintenance purposes and for adapting to a varying energy demand, for example according to the season or for certain periods of the day.

Methods of forming the cold fluid injection well 203, the cold fluid distribution channel 202, the hot fluid collecting channel 205 and the hot fluid extraction well 206 are generally known in the industry.

Note that even if the array shown in FIG. 2 is of a substantially rectangular form, other array forms may be used, such as a radial form, or any other array form or arrangement.

Figure 3:
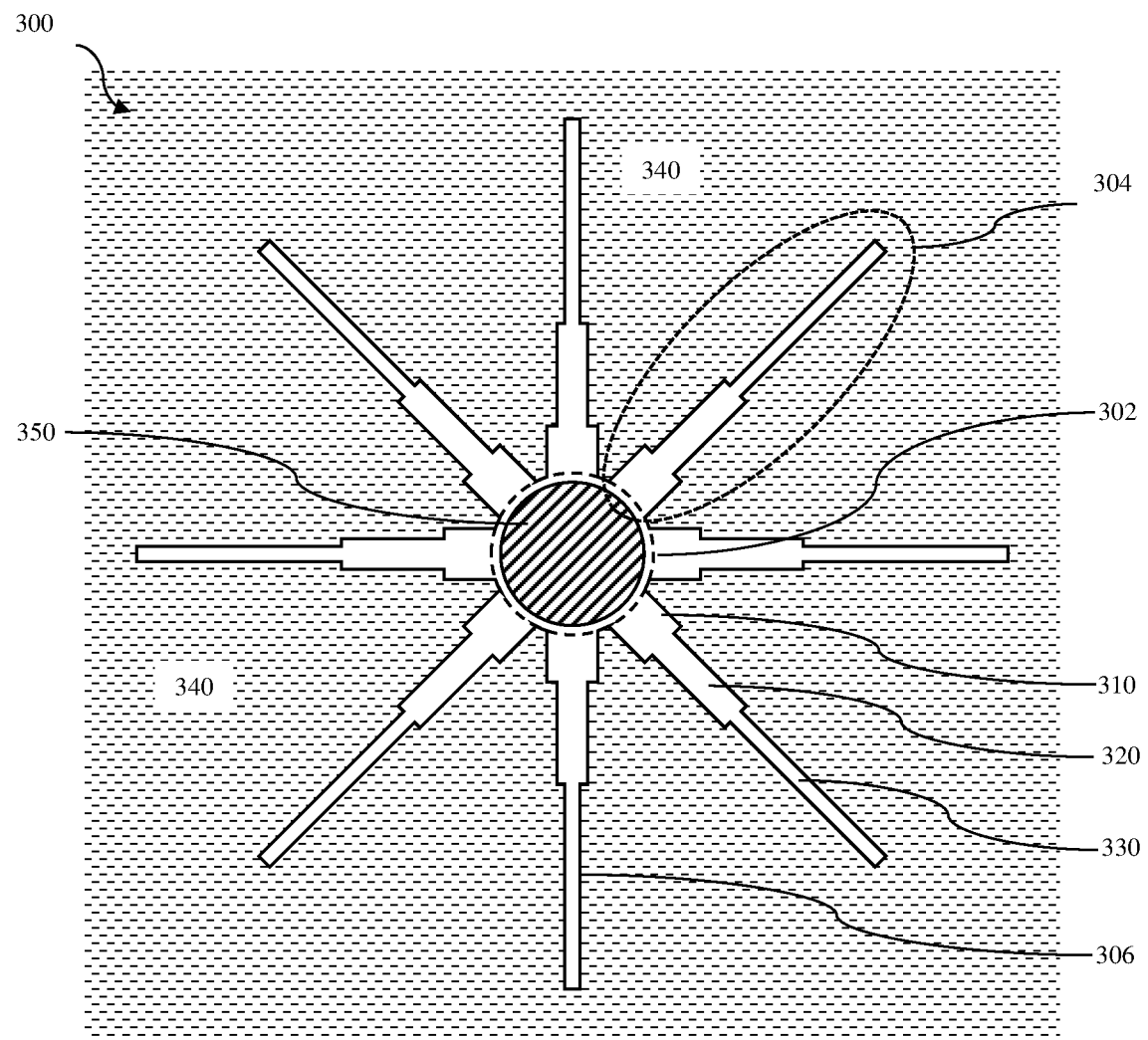
FIG. 3 is a cross section view of a heat exchange channel according to the invention.

Referring now to FIG. 3, a cross section view of a heat exchange channel 300 is shown. The heat exchange channel 300 according to the present invention comprises a central hole 302 and a number of fins 304 made of regions of varying thickness (RVTs) 310, 320, 330 disposed radially around the central hole 302, generating a substantially larger contact (i.e. heat exchange) surface 306 with the underground bedrock 310 than the surface of the central hole 302. The central hole 302 may be optionally obstructed partially or completely with a rod plug or piping segment 350 of appropriate shape (such as a conical shape or having conical end portions) and size in order to adjust the fluid flow resistance, so that the speed of the fluid flow through transverse holes along the length of the tube allows a maximized heat exchange with the underground bedrock 340. The rod piping segment 350 may be produced on site. Where the piping segment is a composite, or a composite cement, rubble removed during drilling may be reusing so as to minimize extraction efforts.

The proportions of the fins 304, and the size and shape of the rod piping segment 350 may vary along the length of the heat exchange channel 300 to optimize the fluid flow speed in order to accommodate the change of temperature difference between bedrock and fluid and keep the heat transfer rate as high as possible. The fins 304 are preferably disposed regularly around the central hole 302) or irregularly as appropriate to optimize the fluid flow, taking into account the effects of gravity on the fluid flow, the local stress condition of the host rock material and on the possible deposits of bedrock materials being progressively eroded by the fluid flow, and facilitating the maintenance of the installation.

Figure 12A:
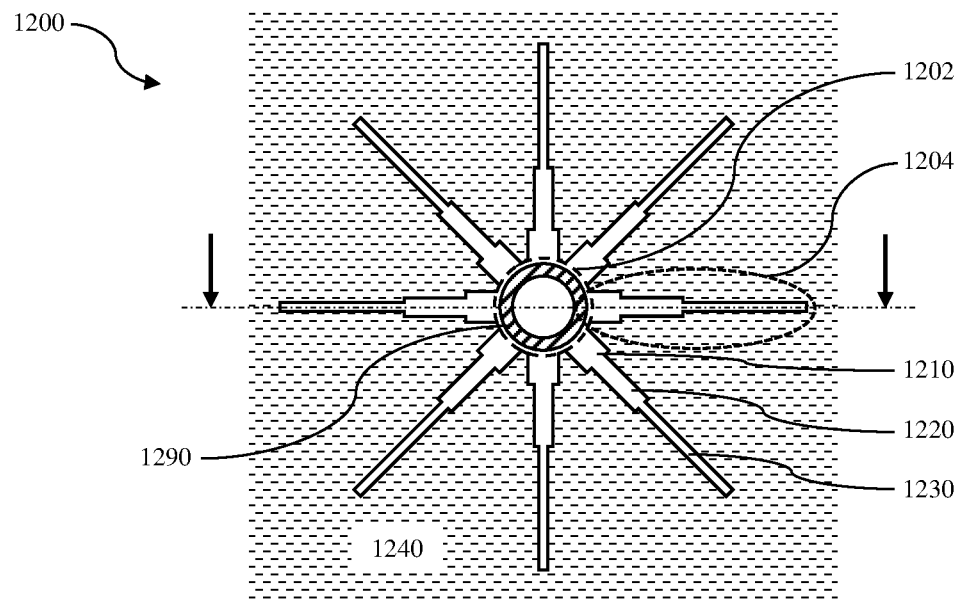
FIG. 12A-B are cross section views of a heat exchange channel according to the invention.

Referring to the embodiment of FIG. 12A but modified with the fin located at 0 degrees removed, all fins 304 are all disposed at or between 45 degrees and 315 degrees, with zero being at 12 o'clock. In another embodiment, all fins 304 are disposed at or between 90 degrees and 270 degrees (for example, again, the embodiment of FIG. 12A but with the upper three fins removed).

An example of the size of the heat exchange channel 300 is as follows:
Diameter of the central hole 302: ~20 cm to ~40 cm
Number of fins: ~8
Length of the first RVT 310: ~10 cm
Length of the second RVT 320: ~20 cm
Length of the third RVT 330: ~40 cm As a result, for the above example where the diameter of the central hole is ~20 cm, the perimeter of the contact surface 306 is in one embodiment about 11.82 m, 18.8 times larger than the circumference of the central hole 302, assuming the hole is round, which is in the example 0.628 m. A heat exchange channel 300 according to the present invention therefore has a drastically increased contact surface compared to the state of the art. In the above example, a contact surface of 1182 $m^2$ over a length of only 100 m with the bedrock can be achieved. Increased contact surface of course means more heat conduction into the fluid.

Please note that as used herein, wording like "circular circumference, diameter, . . . " should be considered as also encompassing square, polygonal, oval and other forms in cross section. Typically, however, a circular hole is the easiest to create.

Note that although the heat exchange channel 300 shown in FIG. 3 has 8 fins made of 3 RVTs, any combination of number of fins and number of RVTs is possible.

Referring now to FIGS. 4A to 4D, a first method to realize the heat exchange channel 400 of the present invention in the underground bedrock 440 is described as follows:

Step 1.1: Realization of the cold fluid injection well, the cold fluid distribution channel, the hot fluid collecting channel and the hot fluid extraction well with usual methods as generally known in the borehole/drilling/tunnel industry. Note that the dimensions of the wells and of the distribution/collecting channels must be sufficient to allow the passage of the tools and equipment for the execution of the next steps of the method, and for the extraction of the rubble. Consequently, the access well can have a large opening from ground level to the depth of the hot bedrock, the relatively large dimension of the hole allows plenty of room for human access and for insulation surrounding the return flow channel.

Figure 4A:
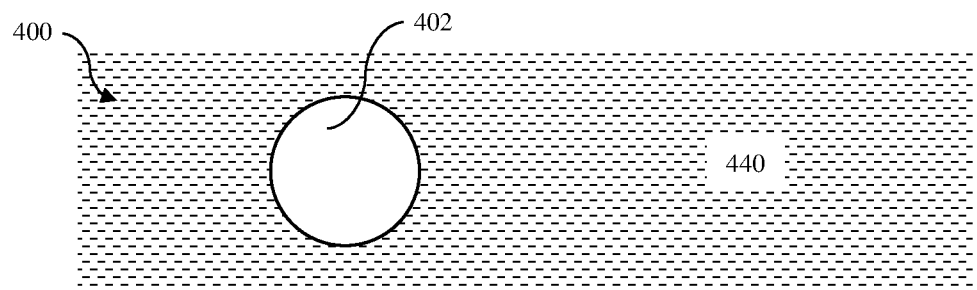
FIGS. 4A-D are cross section views of the steps of realization of the heat exchange channel of the present invention.

Step 1.2, as shown in FIG. 4A: drilling the central hole 402.

Figure 4B:
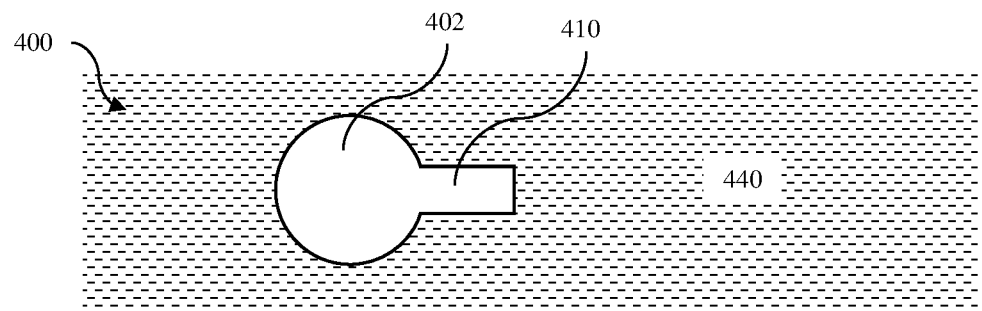
Figure 4C:
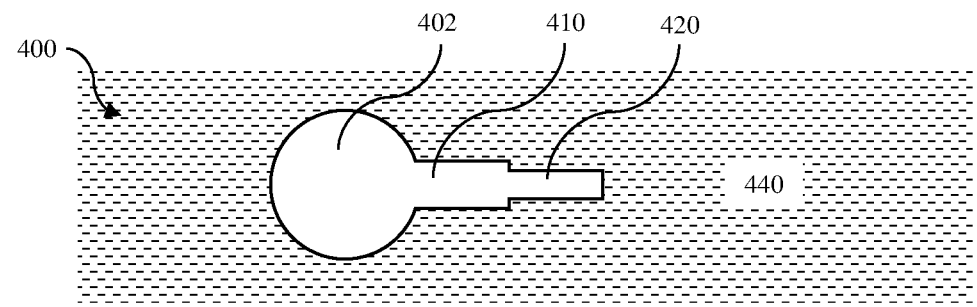
Figure 4D:
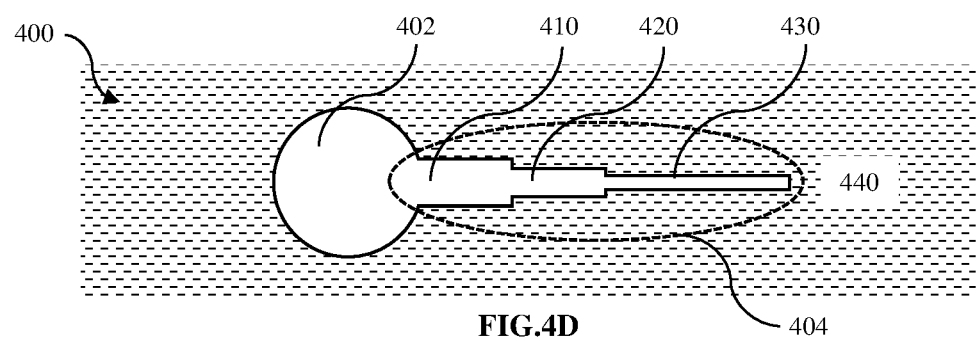

Step 1.3, as shown in FIG. 4B: digging the first notch for the RVT 410 of the first fin 404, (shown in FIG. 4D). The length and width of the first notch for the RVT 410 are defined by combining the available space in the central hole 402 with the space necessary to accommodate the digging equipment and the extraction of the excavated material.

Step 1.4, as shown in FIG. 4C: digging the second notch for the RVT 420. The length and width of the second notch for the RVT 420 are defined by combining the available space in the central hole 402 and the first notch for the RVT 410 with the space necessary to accommodate the digging equipment and the extraction of the excavated material.

Step 1.5, as shown in FIG. 4D: digging the third notch for the RVT 430. The length and width of the third notch for the RVT 430 are defined by combining the available space in the central hole 402, the first notch for the RVT 410 and second notch for the RVT 420 with the space necessary to accommodate the digging equipment and the extraction of the excavated material.

Step 1.6 (not shown): rotate the digging equipment around the axis of the central hole 402 and start the formation of the next fin 404 with step 1.3. Repeat until having obtained the desired number of fins.

A second method for realizing the heat exchange channel 300 of the present invention in the underground bedrock 340 may be described as:

Step 2.1: forming of the cold fluid injection well, the cold fluid distribution channel, the hot fluid collecting channel and the hot fluid extraction well with usual methods generally known in the borehole/drilling/tunnel industry. Note that the dimensions of the wells and of the distribution/collecting channels must be sufficient to allow the passage of the tools and equipment for the execution of the next steps of the method, and for the extraction of the rubble. Consequently, the access well can have a large opening from ground level to the depth of the hot bedrock, the relatively large dimension of the hole allows plenty of room for human access and for insulation surrounding the return flow channel.

Step 2.2: drilling of the central hole 302.

Step 2.3: digging the first notch for the RVT 310 of the first fin 304. The length and width of the first notch for the RVT 310 are defined by combining the available space in the central hole 302 with the space necessary to accommodate the digging equipment and the extraction of the excavated material.

Step 2.4: rotating the digging equipment around the axis of the central hole 302 and repeating step 2.3 until having obtained all the first notches for the RVTs 310 of all the fins 304.

Step 2.5: digging the first second notch for the RVT 320. The length and width of the second notch for the RVT 320 are defined by combining the available space in the central hole 302 and the first notches for the RVTs 310 with the space necessary to accommodate the digging equipment and the extraction of the excavated material.

Step 2.6: rotating the digging equipment around the axis of the central hole 302 and repeating step 2.5 until having formed all the second notches for the RVTs 320 of all the fins 304.

Step 2.7: digging the first third notch for the RVT 330. The length and width of the third notch for the RVT 330 are defined by combining the available space in the central hole 302, the first notches for the RVTs 310 and second notches for the RVTs 320 with the space necessary to accommodate the digging equipment and the extraction of the excavated material. Note that the relatively complex form of the central hole with fins is only advantageous at the depth of the hot bedrock, i.e. in depths of more than 500 and up to several thousands of meters.

Step 2.8: repeat step 2.7 until having formed all the third notches for the RVTs 330 of all the fins 304.

Note that any alternative sequence or combination of steps of the methods described herein are also to be considered as comprised in the present invention.

Figure 5:
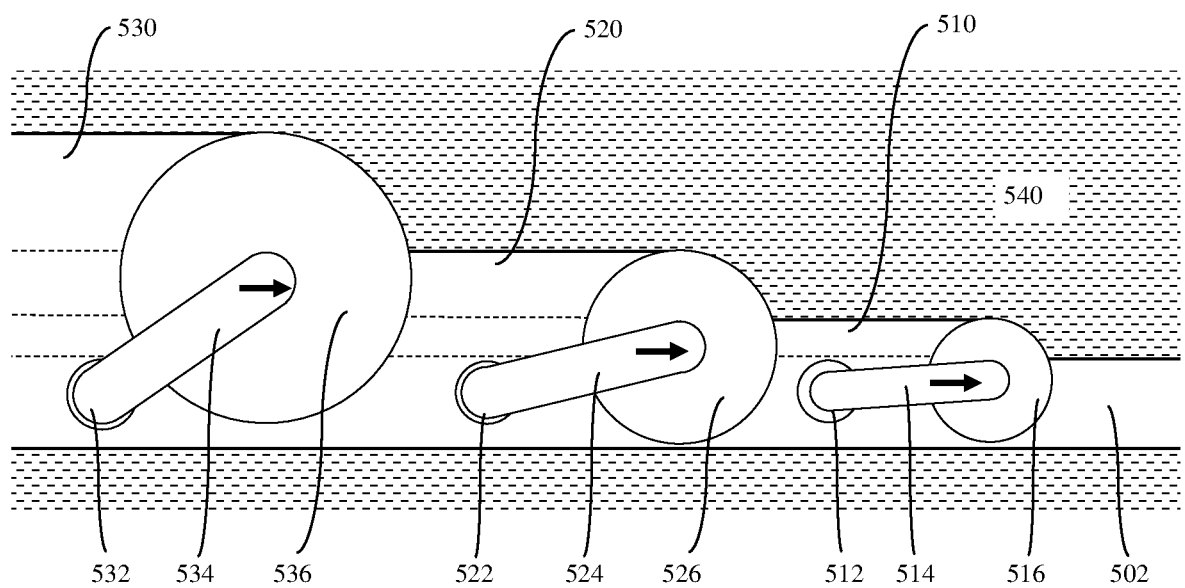
FIG. 5 is a cross section view of the heat exchange channel and the tools and equipment used to make the heat exchange channels.

Referring now to FIG. 5, more information is disclosed on some of the tooling and equipment used for the realization of the first or second method. For a better understanding of the relative dimensions, the tooling of steps 1.3, 1.4 and 1.5 (respectively 2.3, 2.4, 2.5, 2.6, 2.7, 2.8) are shown as if they were operating all at the same time, but in reality, each step may be done one after the other, essentially according to the sequences described in the methods above. Equipment in the prior art like excavation systems, extraction systems, cleaning systems, etc are not discussed here, but may be necessary for the execution of the said methods.

The equipment for either of the steps 1.3, 1.4 or 1.5 (respectively 2.3, 2.4, 2.5, 2.6, 2.7, 2.8) may contain a motor (512, 522, 532), a transmission body (514, 524, 534), a rotating digging/sawing tool (516, 526, 536), crawling/displacement systems (not represented here), and cooling systems (not represented here).

Rotating digging/sawing tools 516, 526, 536 may contain one or more diamond disks and/or spikes, and are dimensioned to the maximum diameter possible to fit within the space available, while leaving sufficient space for the extraction of the rubble. The diameter of the rotating digging tool 516 for the digging of the first notch for the RVT 510 is smaller than the diameter of the central hole 502. The diameter of the rotating digging tool 526 for the digging of the second notch for the RVT 520 is smaller than the addition of the diameter of the central hole 502 and the depth of the first notch for the RVT 510. The diameter of the rotating digging tool 536 for the digging of the third notch for the RVT 530 is smaller than the addition of the diameter of the central hole 502, the depth of the first notch for the RVT 510 and the depth of the second notch for the RVT 520. Note however that when a relatively large (approx. 2 m diameter) center hole is excavated it may simply be round, and therefore formed using known methods up to the depth of 3000 m or so, as mentioned earlier. In addition, microtunneling machines are known to dig tunnels as small as 1 m in diameter, even smaller. Consequently, the size of the access tunnel will be determined based on the design need.

Note however that when a relatively large (approx. 2 m diameter) center hole is excavated, it may simply be round, and therefore formed using known methods up to the depth of 3000 m or so, as mentioned earlier. Of course, any size hole may be used, such as shown in FIG. 6, 7, or 8.

The motors 512, 522, 532 are of an appropriate size to be able to enter and to operate within the central hole 502, while leaving sufficient space for the extraction of the rubble.

The transmission bodies 514, 524, 534 transmit the rotation power to the rotating digging tools 516, 526, 536 and the force that must be applied against the bedrock to dig it. The transmission body 514 for the realization of the first notch for the RVT 510 is narrow enough to fit within the space allowed by the central hole 502 and the motor 512. The transmission body 524 for the realization of the second notch for the RVT 520 is narrow enough to fit within the space allowed by the central hole 502, the first notch for the RVT 510 and the motor 522. The transmission body 534 for the realization of the third notch for the RVT 530 is narrow enough to fit within the space allowed by the central hole 502, the first notch for the RVT 510, the second notch for the RVT 520 and the motor 532, and so on.

Figure 6:
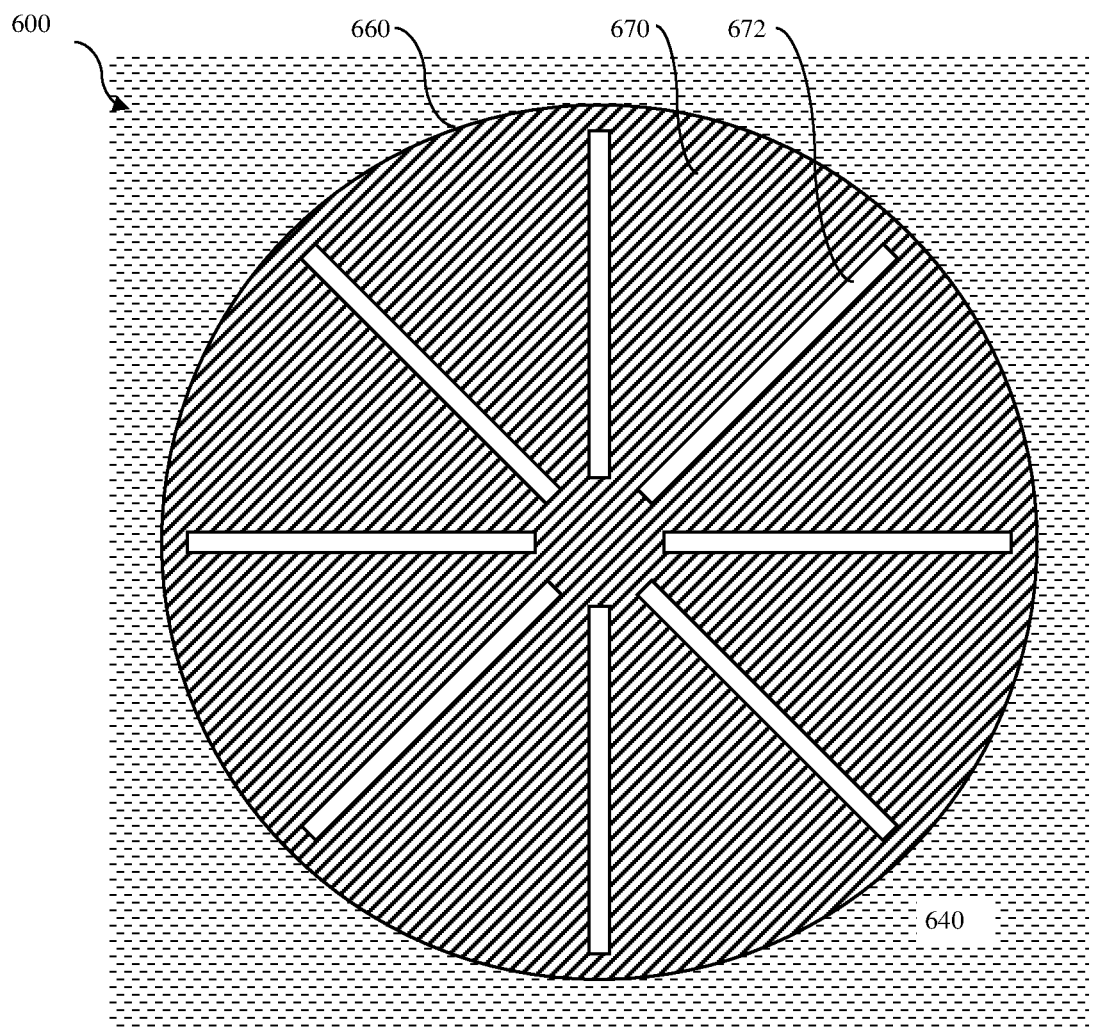
FIG. 6 is a cross section view of an alternative heat exchange channel according to the invention.
Figure 7:
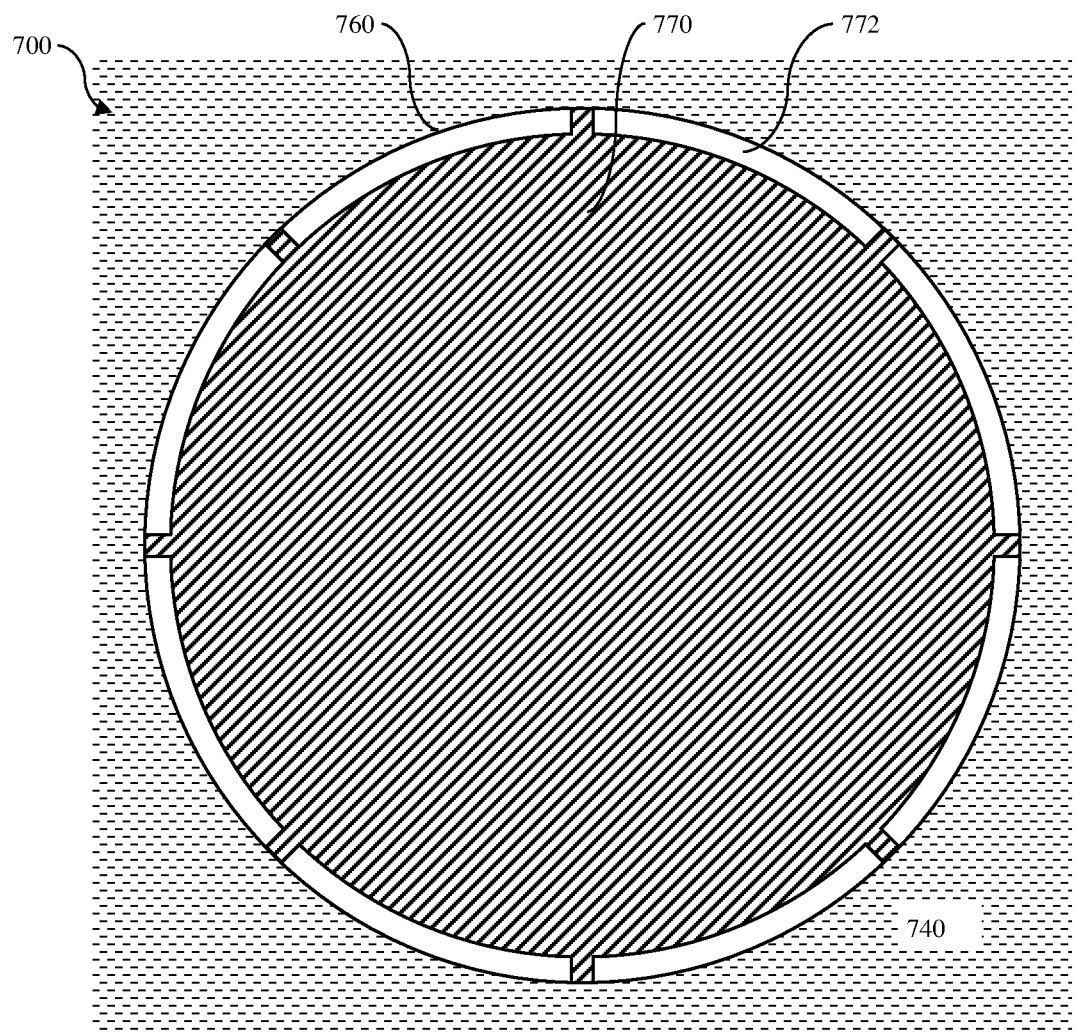
FIG. 7 is a cross section view of another alternative heat exchange channel according to the invention.
Figure 8:
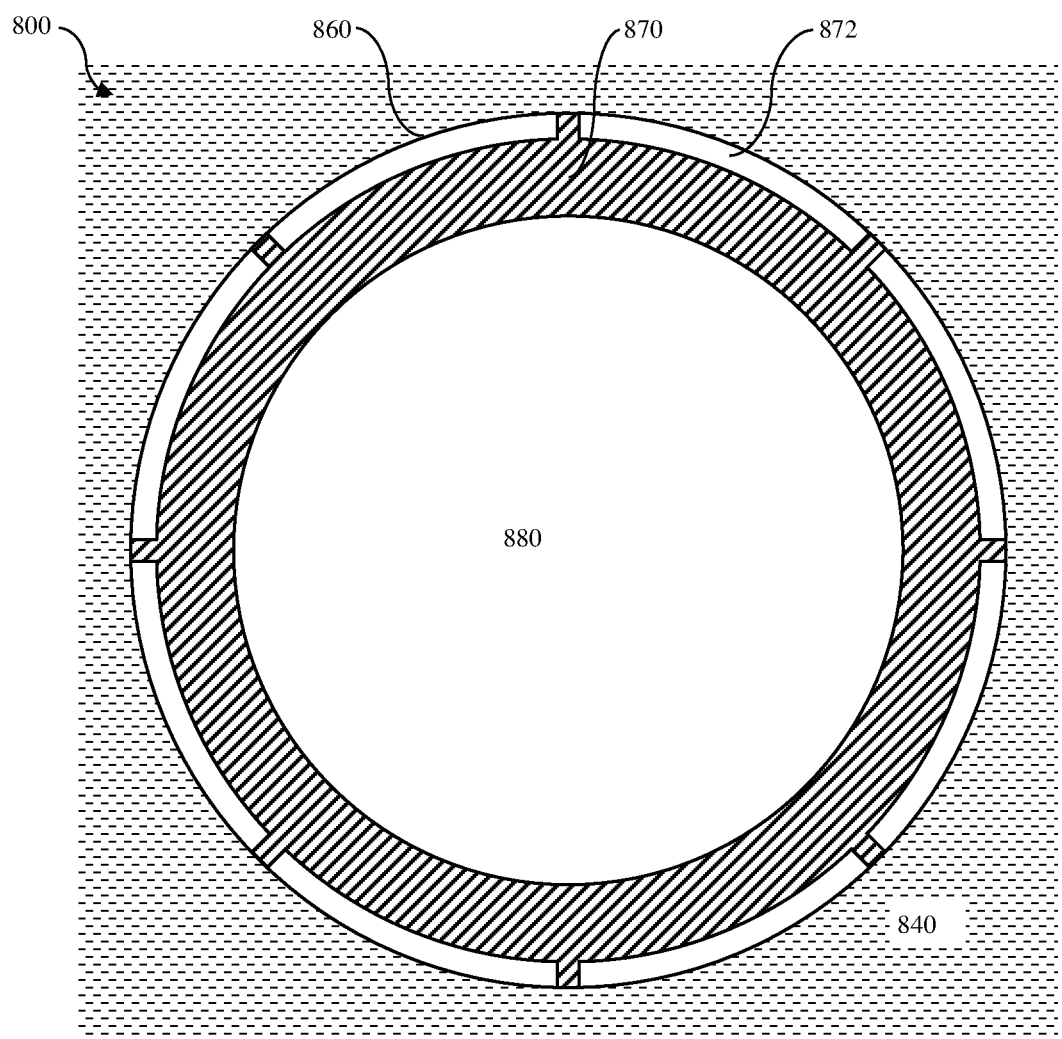
FIG. 8 is a cross section view of still another alternative heat exchange channel according to the invention.

Referring now to FIG. 6, FIG. 7 and FIG. 8, alternative embodiments of the heat exchange channel 600, 700, 800 of the present invention may be realized as a number of piping segments 670, 770, 870 containing narrow, built-in fluid channels 672, 772, 872 through their entire length, installed one after the other in a hole 660, 760, 860 and hermetically sealed with heat conductive material. In order to keep the amount of material to be excavated to the surface as low as possible, the piping segments 670, 770, 870 may essentially be made at least in part out of the rubble generated by the drilling of the hole 660, 760, 860. The narrow fluid channels 672, 772, 872 are dimensioned so as to optimize the fluid flow and the heat exchange between the fluid and the underground bedrock 640, 740, 840. The geometry of the narrow fluid channels 672, 772, 872 may vary along the length of the heat exchange channel 600, 700, 800 to optimize the fluid flow speed in order to accommodate the change of temperature difference between bedrock and fluid and keep the heat transfer rate as high as possible.

Referring now to FIG. 8, the piping segment 870 may have a hole 880 in its center so as to be constructed in a similar way as usual linings built by tunnel boring machines. Such configuration of the piping segment may have an additional advantage in allowing passage for maintenance and monitoring of the heat exchange channel 800.

Figure 9A:
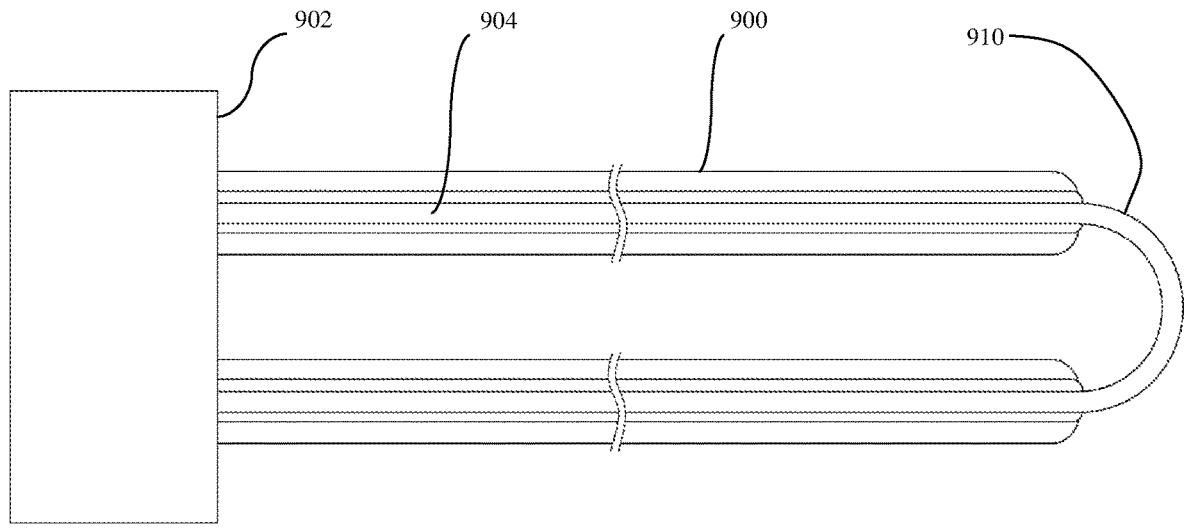
FIG. 9A-B are top views of alternative installations according to the invention
Figure 9B:
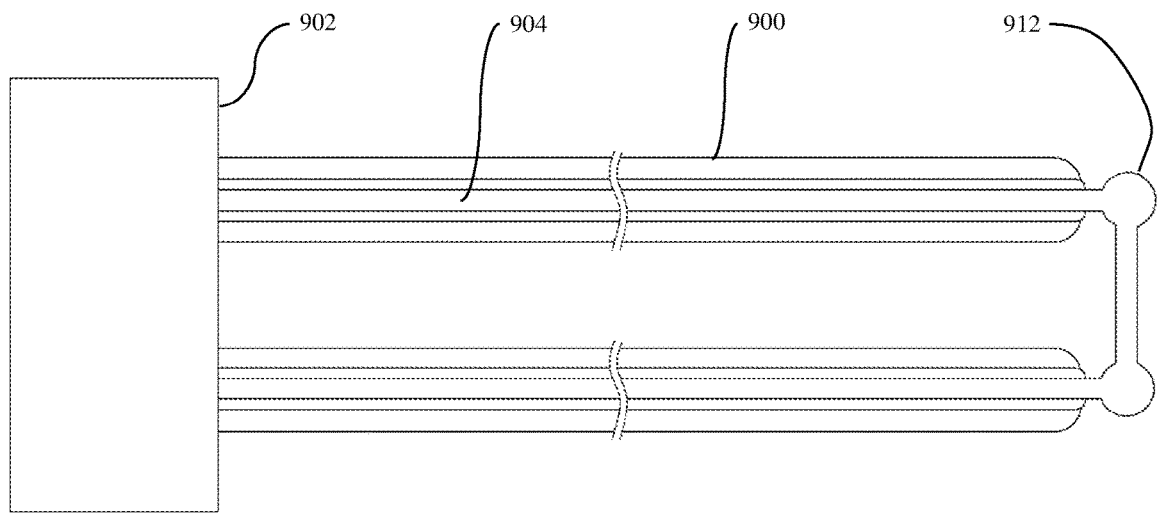

Referring now to FIG. 9A-9B, an alternative installation according to the present invention may be made without the use of a hot fluid collecting channel 205 and hot fluid extraction well 206. Instead, the access well of the installation may contain the piping for cold fluid injection and for hot fluid extraction and connect to the heat exchange channels 900 via a tunnel 902, in which the necessary connection piping is installed. In such a configuration, the heat exchange channels 900 may be used as head-to-tail pairs. To make the head-to-tail connection, the equipment drilling the central hole 302, 402, 502, 660, 760, 860 may have the capacity to make turns 910 or to create intermediary chambers 912 in which it may change direction.

Figure 10:
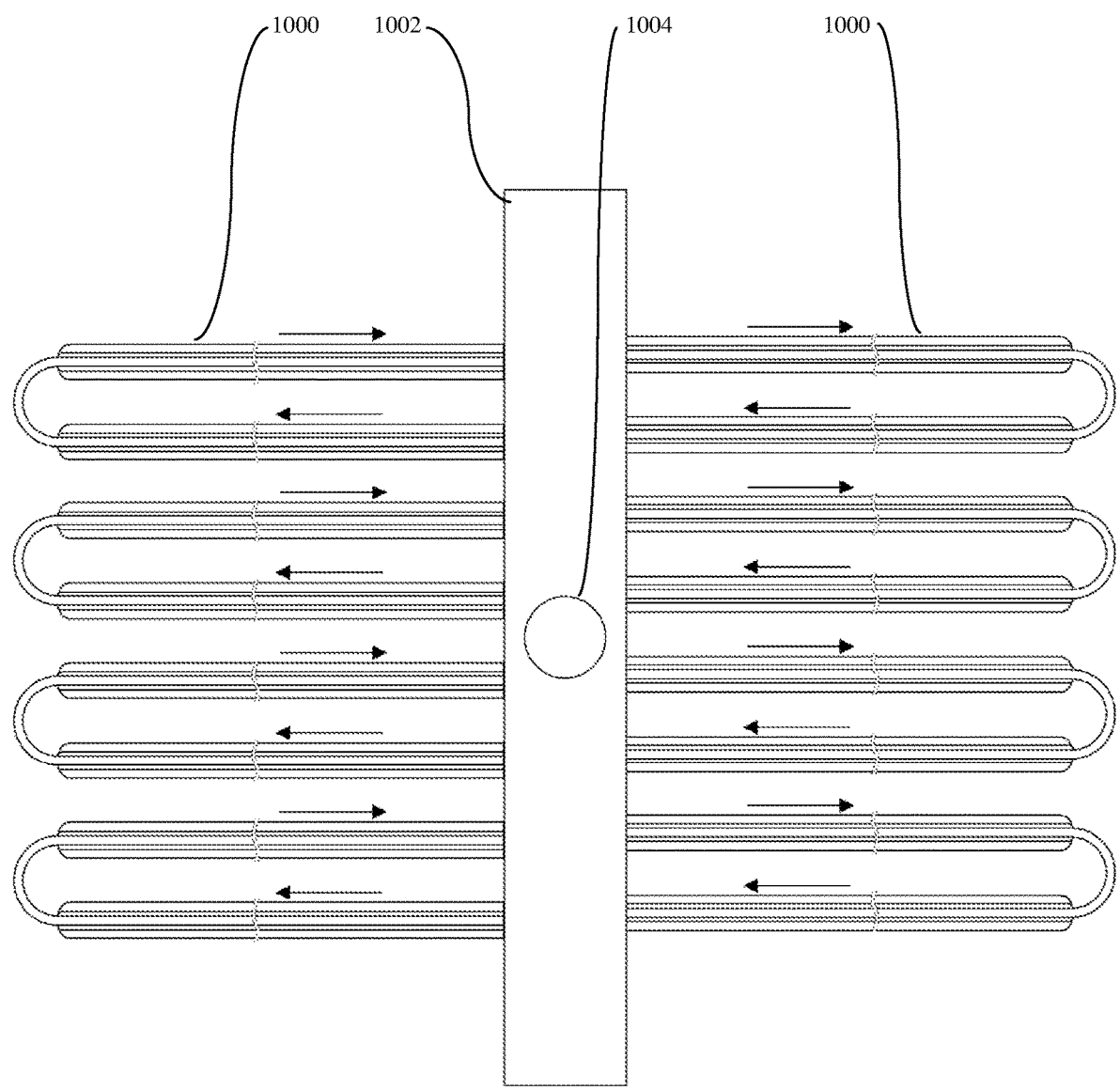
FIG. 10 is a top view of another alternative installation according to the invention
Figure 11:
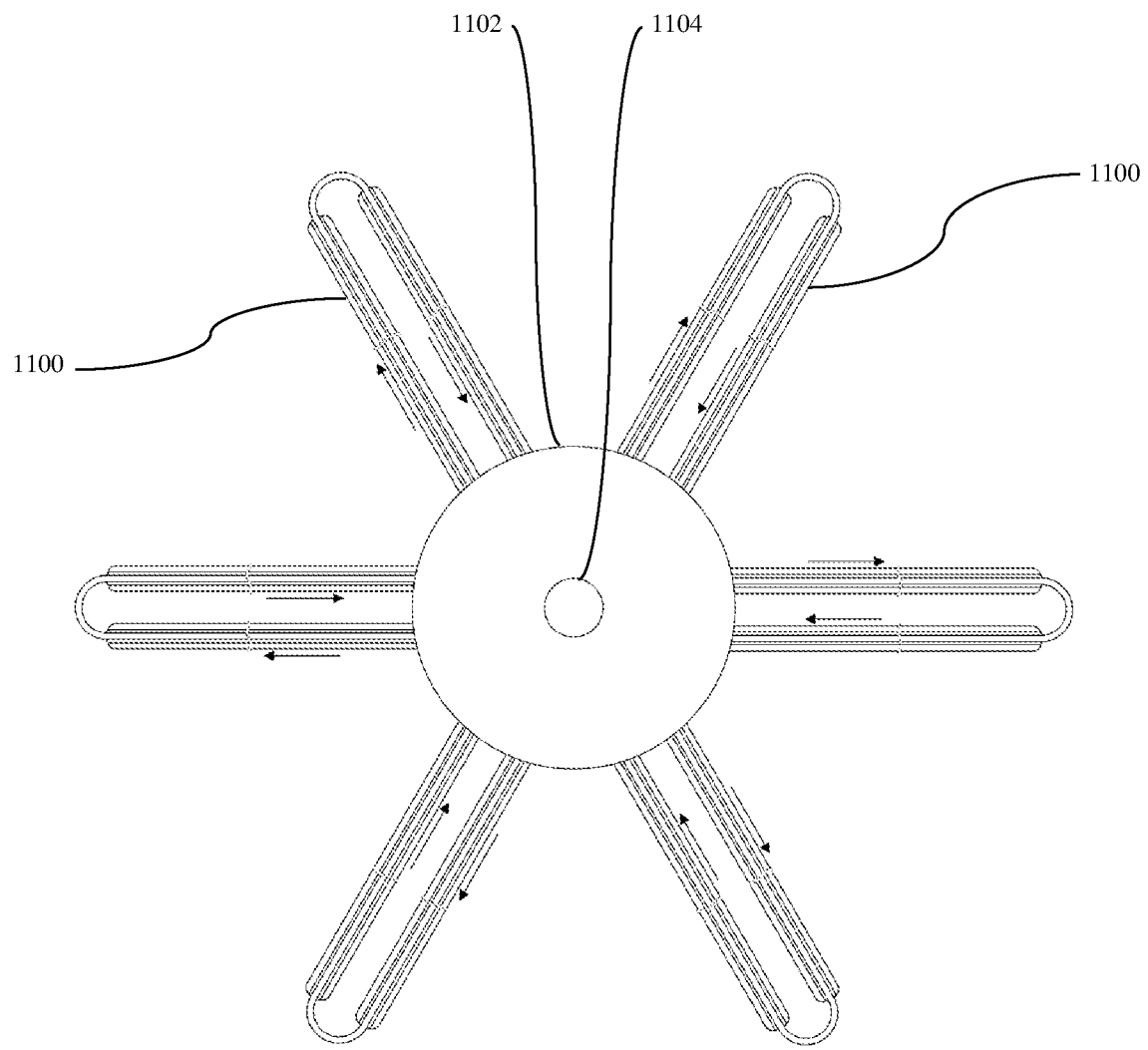
FIG. 11 is a top view of still another alternative installation according to the invention

Referring now to FIG. 10 and FIG. 11, an installation according to the present invention may have only one access well 1004, 1104, connected to the heat exchange channels 1000, 1100 via a tunnel 1002 or a chamber 1102. The heat exchange channels 1000, 1100 may be arranged in any geometrical configuration, such as rectangular (FIG. 10) or central configuration (FIG. 11), or any other appropriate configuration.

Figure 12B:
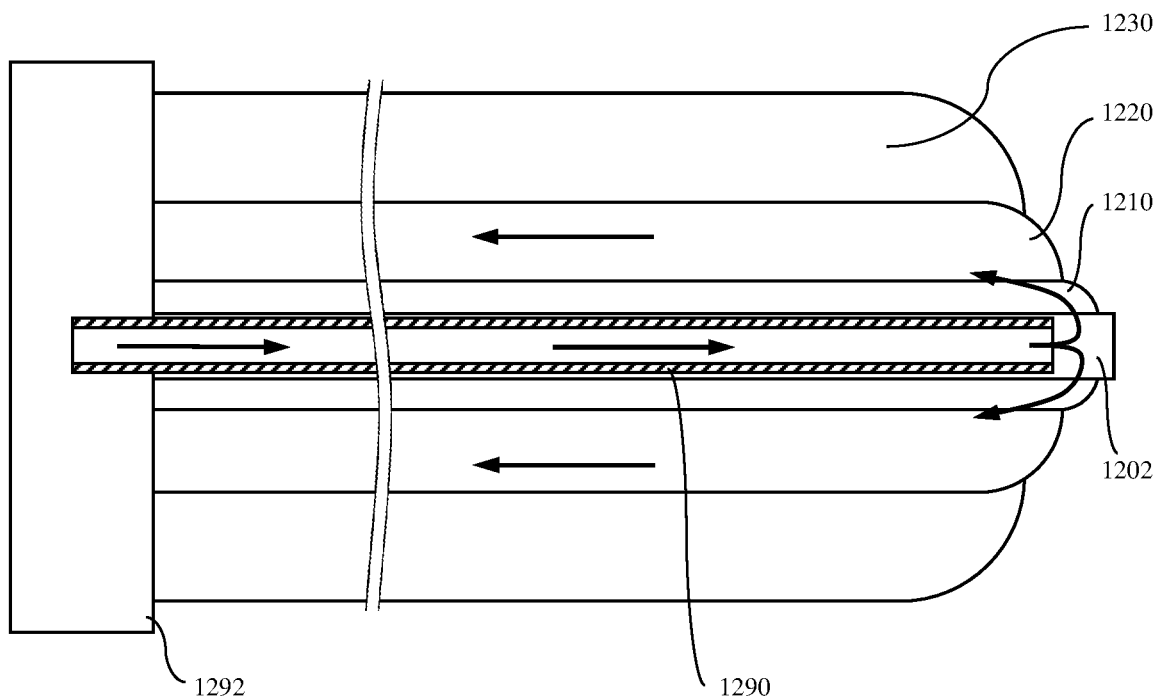

Referring now to FIG. 12A-12B showing cross section views of a heat exchange channel 1200, the heat exchange channel 1200 according to the present invention comprises a central hole 1202 and a number of fins 1204 made of RVTs 1210, 1220, 1230 disposed radially around the central hole 1202, generating a substantially larger contact surface with the underground bedrock 1240 than the mere surface of the central hole 1202. In the central hole, a cold fluid injection pipe 1290 forces fluid to circulate from the well via the chamber 1292 through the entire length of the heat exchange channel 1200 before circulating back through the fins 1204, as indicated by the arrows in FIG. 12B. Resulting hot fluid is collected in the chamber 1292 and extracted to the Earth surface via the well.

Figure 13A:
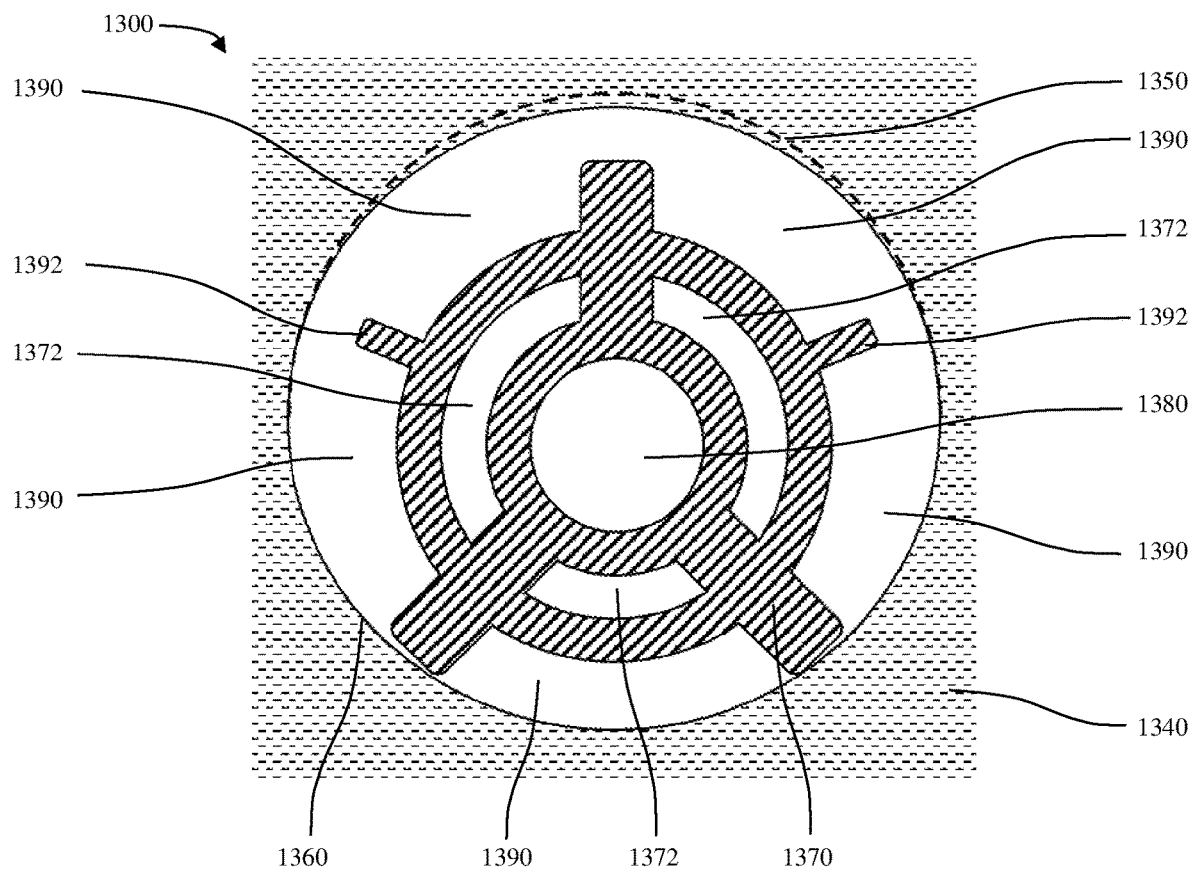
FIG. 13A-B are cross section views of a heat exchange channel according to the invention
Figure 13B:
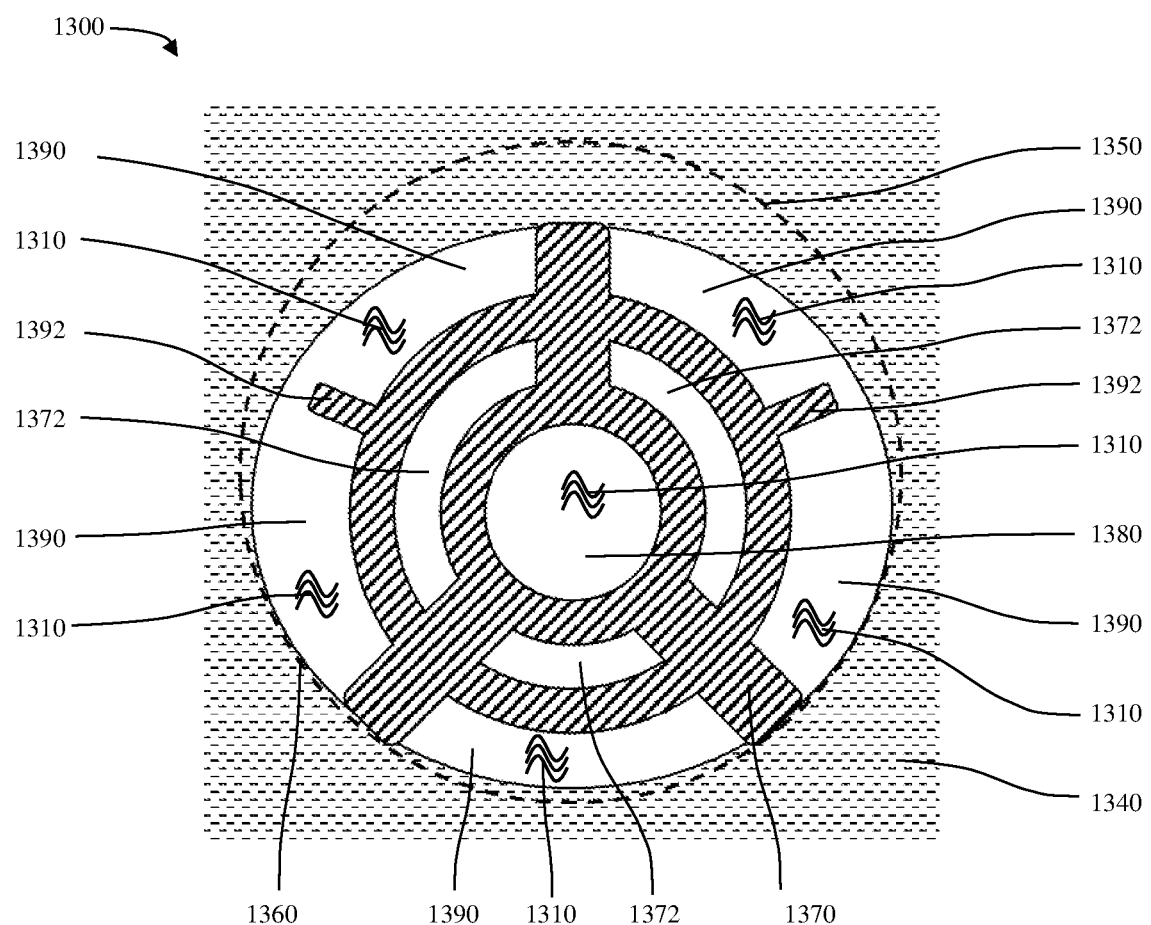

Referring now to FIG. 13A-B, the heat exchange channel or micro-tunnel 1300 may be optimized for working at very high depth, such as beyond 3 km depth. In such high depth, the bedrock 1340 may be drilled cylindrically 1350, however the resulting micro-tunnel 1360 may deform over time due to the high pressure in the bedrock, and bedrock particles being released in the tunnel depending on the bedrock's brittle behaviour combined with the erosion generated by fluids circulating in the micro-tunnel, or due to the natural creeping of the bedrock. As shown in FIG. 13A, just after drilling the micro-tunnel 1360 may have a slightly oval shape compared to its original drilling shape 1350, and as shown in FIG. 13B, the micro-tunnel will have a tendency to shrink and close over the years. To preserve the flow though the micro-tunnel, even after erosion, a structure such as a piping 1370 may be placed in the micro-tunnel. After drilling, the piping 1370 is installed in the micro-tunnel 1360. The piping may be realised as a chain of segments 1370, the length of the segments 1370 being selected so as to adapt to the imperfect straightness of the micro-tunnel and to allow sufficient flexibility to accommodate potential future small movements of the bedrock 1340 while still ensuring the tight circulation of the heat transfer fluid 1310. In such case the shape of the piping 1370 is adapted to support the micro-tunnel ceiling while still ensuring the back-and-forth parallel, axial, optionally nested circulation (i.e., essentially co-axial wherein a central passage is nested within another passage to provide for co-axial, parallel circulation) of the heat transfer fluid 1310 over the years (see FIG. 13B). The piping 1370 may contain insulation pockets 1372 filled with vacuum, with gas or any other appropriate insulating material in any appropriate phase state in order to ensure that the heat transfer fluid 1310 remains as cold as possible within the central hole or passage 1380, before entering in contact with the bedrock for its return on the external surface 1390 of the piping 1370 (or, where the piping segments 1370 are themselves made of insulating material, in a passage similar to passage 1372 enclosed therein). In this way, a parallel axial circulation of the heat transfer fluid 1310 is ensured, the heat transfer fluid 1310 entering into the micro-tunnel through the central passage 1380 of the piping 1370 and returning on the external side 1390 of the piping, in direct contact with the bedrock. Fins 1392 may be added in a regular or irregular arrangement on the external surface 1390 of the piping, in order to give a more turbulent flow of the heat transfer fluid 1310, improving further the thermal contact between the bedrock 1340 and the heat transfer fluid 1310. The circulation of the heat transfer fluid 1310 may of course also be inverted, going into the micro-tunnel on the external surface of the piping 1390 and coming back through the inside passage 1380 of the piping. The piping segments 1370 may be made at least in part with the rubble produced by the drilling of the micro-tunnel 1360. Each piping segment 1570 is tightly connected to its preceding and following segments, using interlocking shapes, seals, glue, etc as well known in the industry. Obviously, the description here applies for a micro-tunnel that is drilled in a horizontal direction (hence the use of "tunnel ceiling" word), but the same invention may also be used for micro-tunnels drilled at any inclination, including vertical and deflected ("deflected" being a term used in the mining world to describe a drilling that has 2 or more substantially straight segments with an angle between them), because in order to last for several decades, the micro-tunnels need to be protected against shrinkage. In the case of a vertical micro-tunnel, the piping 1370 may be made with a more symmetric shape to protect against shrinkage in all directions.

Figure 14A:
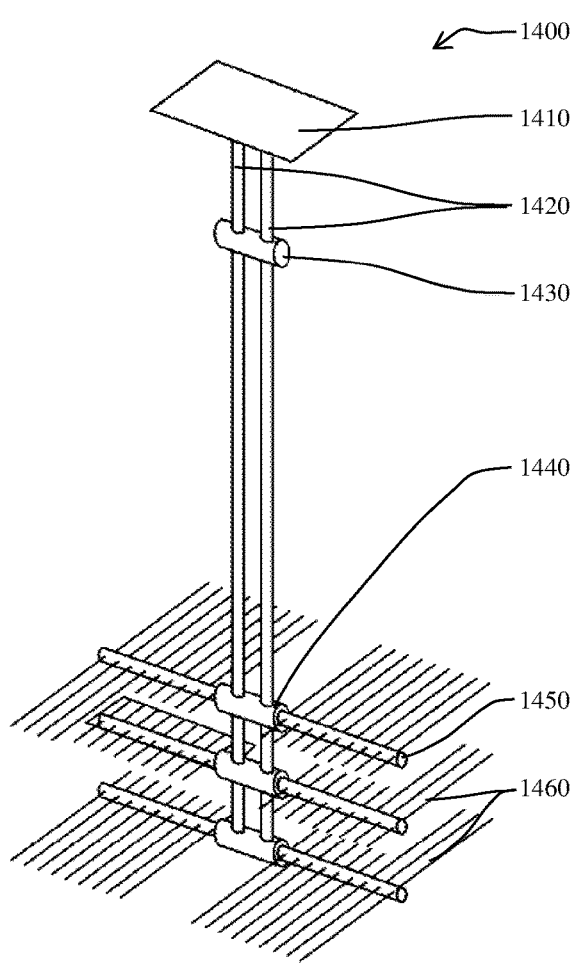
FIG. 14A-E are schematic views of an installation according to the invention
Figure 14B:
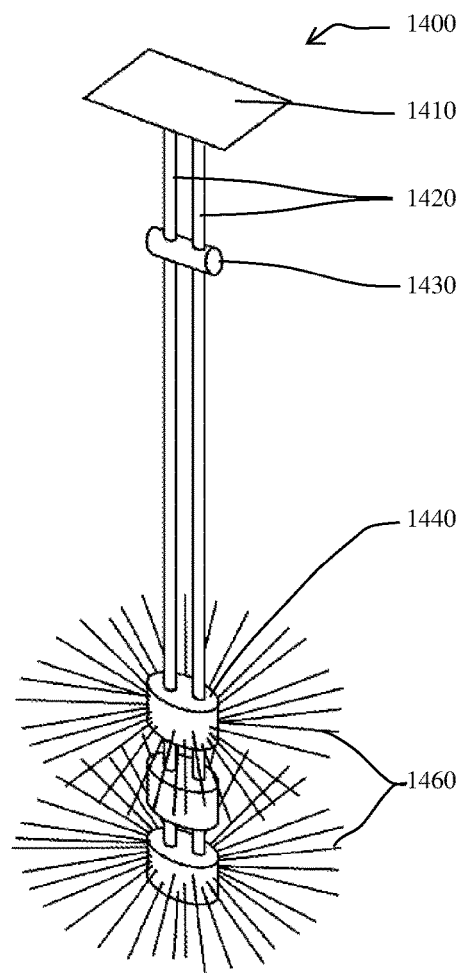
Figure 14C:
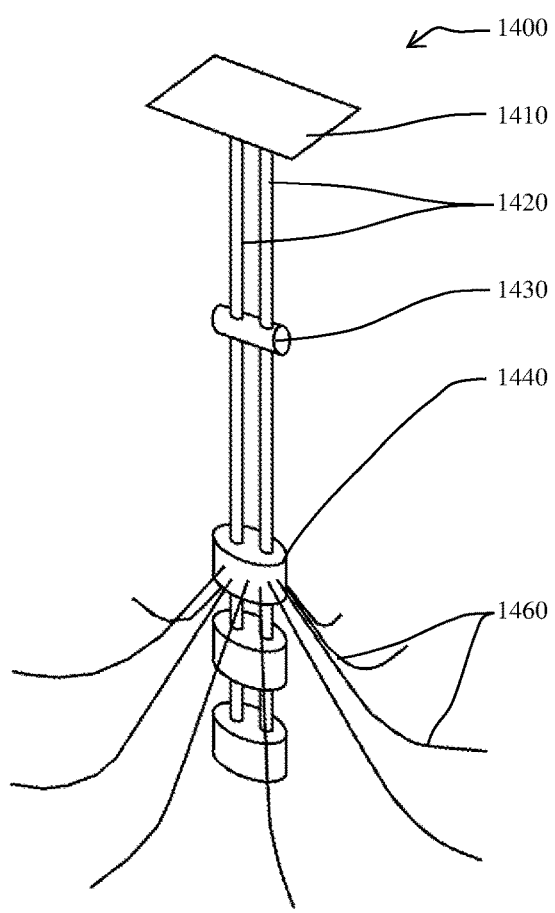
Figure 14D:
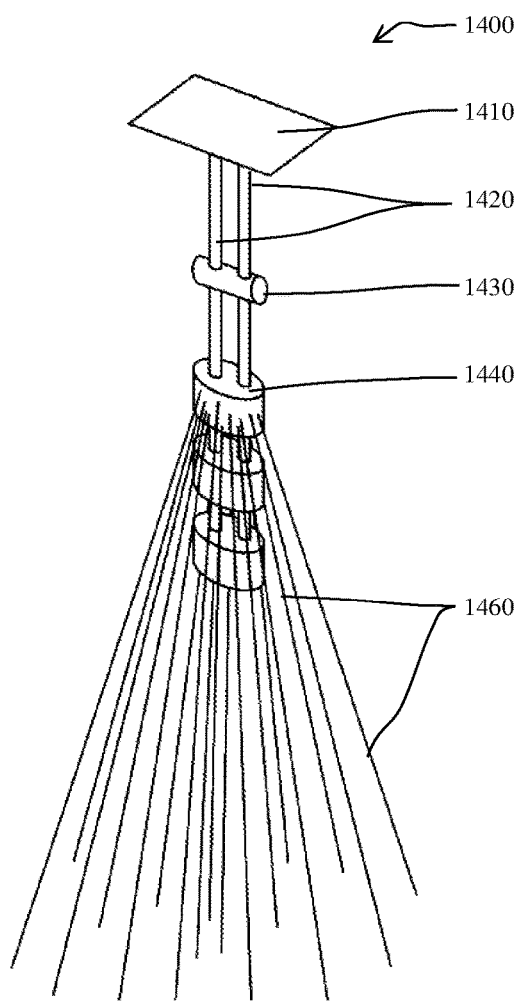
Figure 14:
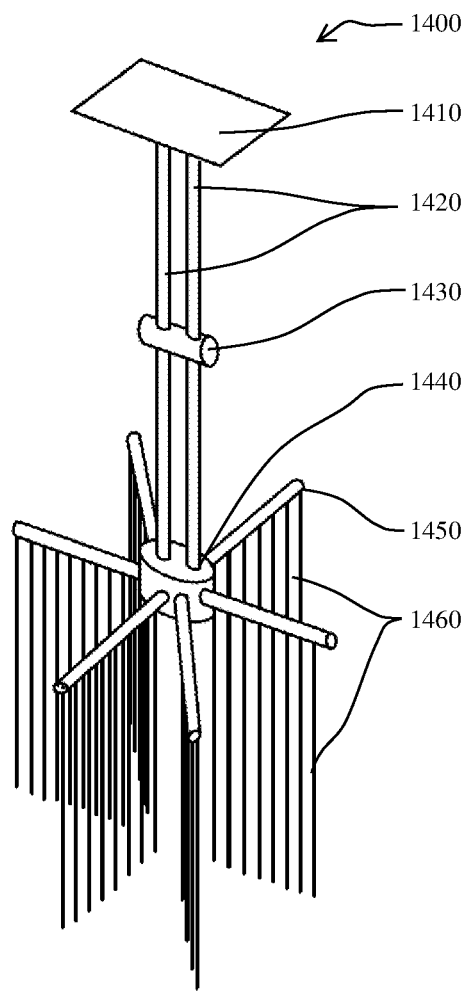

Typical characteristics for such heat exchange channel or micro-tunnel 1300 may be as follows:
Drilling diameter: 6"
Depth under the Earth's surface: 5'000 m
Bedrock temperature: 150° C.
Collected heat for 1 m of heat exchange channel/micro-tunnel: 150 W for +40 years
Electricity generated for 1 m of heat exchange channel/micro-tunnel: 50 W for +40 years Referring now to FIG. 14A-E, an installation 1400 according to the present invention may be adapted for very high depth, such as beyond 3 km of depth. At least one vertical shaft and/or well 1420 is dug into the earth's surface 1410. More such wells 1420 may be added for safety reasons. After the first vertical shaft ("blind shaft") 1420 is dug downwards from the surface 1410, the next vertical shaft(s) may be dug from underneath, from a transversal tunnel or cavern 1430 ("raise bore"). The vertical shafts are connected at appropriate intervals by transversal tunnels or caverns 1430. Upon reaching the appropriate depth for heat harvesting, a large cavern 1440 is created, and a network of collecting tunnels 1450 may be added. Either directly from the large cavern 1440 or from the collecting tunnels 1450, micro-tunnels 1460 are drilled at any appropriate direction to reach a maximum volume of bedrock and collect a maximum of heat. Depending on the surrounding bedrock properties and temperature, the micro-tunnels may be drilled horizontally and organized as a rectangular pattern (see FIG. 14A), or as a radial pattern (see FIG. 14B). The micro-tunnels 1460 may also be drilled at any other inclination (see FIG. 14C), deflected (such as shown in FIG. 14D) or even vertically (see FIG. 14E). Horizontal (or nearly horizontal) drilling of the micro-tunnels 1460 presents advantages in terms of rubble extraction but requires that the cavern 1440 be installed at high depth, and therefore in hot surroundings, which presents a difficult environment for human staff and/or for machinery. Vertical (or nearly vertical) drilling of the micro-tunnels 1460 has the advantage of requiring the large cavern 1440 not to be dug so deep, and so the cavern temperature is consequently less difficult to handle for human staff and/or equipment. However, this makes rubble extraction more difficult due to the micro-tunnels' vertical orientation. In every location where an installation 1400 is created, the micro-tunnels' 1460 drilling angle and the installation configuration may be adapted to the local bedrock characteristics. At least a majority, preferably all of the micro-tunnels are equipped with a heat exchange channel as described in the present disclosure. This heat exchange channel is made up of a chain of piping segments (for example 1370) tightly linked together in order to ensure a closed-loop circulation of the heat transfer fluid. The collected heat is brought to a collector heat exchanger. This collector heat exchanger may be installed in the collecting tunnels 1450 or in the large cavern 1440. The collected heat is fed to an electricity generator 1540 through another closed heat transfer circuit 1530. The electricity generator may be installed in the large cavern, in a less deep location such as in the connecting tunnel/cavern 1430 or on the earth's surface 1410. The remaining heat from the electricity generator may be fed to a heat distribution system for heating buildings or installations on the earth's surface. During times of the day when the power demand is lower in the distribution network, the extra power available may be used for further drilling and installation of further exchange channels in the bedrock, progressively increasing the size of the installation.

Figure 15:
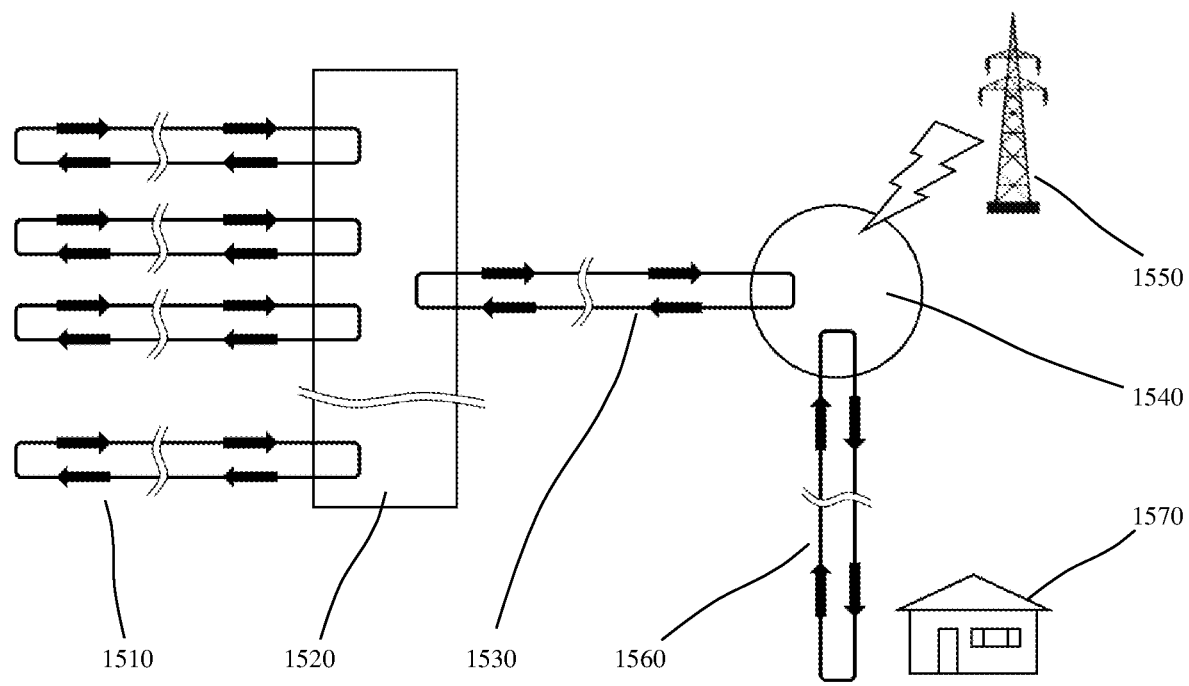
FIG. 15 is a schematic view of the functioning of an installation according to the invention Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described. It should be noted that heat mining can be done vertically, horizontally or at any angle, but also with deflected microtunnel ("deflected" being a term used in the mining world to describe a drilling that has 2 or more substantially straight segments with an angle between them).

Referring now to FIG. 15, the harvesting of the heat in an installation according to the invention is made as follows: each micro-tunnel constitutes a closed circuit 1510, where a heat transfer fluid 1310 is circulating and gathers the heat directly from the surrounding bedrock. The closed circuit 1510 of each micro-tunnel brings the heat to a collector heat exchanger 1520, and the collector heat exchanger feeds the collected heat via a closed circuit 1530 to an electricity generator 1540. The electricity generated can be sent to the power network 1550, and the remaining heat can be sent through a distribution closed circuit 1560 to heat buildings or installations 1570 on the Earth's surface.

In another embodiment, the heat transfer fluid circulation takes place in a closed loop directly from the electricity generator to the micro-tunnels and back. In this case, the cold fluid from the electricity generator is fed into the micro-tunnels in parallel, such that the hot heat transfer fluid comes coming from the micro-tunnels is collected and sent to the electricity generator.

During the functioning of an installation according to the present invention, phenomena potentially decreasing the installation's performance like erosion of the fluid channels, precipitation of eroded bedrock materials, cavitation, fouling, etc may be monitored by pressure monitoring systems and/or flow monitoring systems at several locations within the installation. Temperature of the fluid may be monitored at several locations within the installation.

The surface of the heat transfer channels of the present invention may be treated with one or more layers of anti-fouling and/or sealing (i.e., tightness-enhancing) and/or heat transfer enhancing and/or fluid-repelling coatings. They may also be lined with a heat conductive layer (for example a metal lining, perhaps about 1 cm thick) optionally attached together in a sealed manner (for example, welded or glued), which has the potential of eliminating leakage of the heat exchange fluid and prevent potentially very costly localized cave-ins, as well as provide a safer working environment for maintenance crew or equipment.

In an advantage, the present invention provides an increased efficiency compared to heat exchange channels of the state of the art.

In another advantage, compared to fracking, relatively low fluid pressures are required. Fracking requires pressures of up to 30 MPa, whereas the present invention only requires a fluid pressure necessary to reach and to return from 3-4 km depth, i.e., a pressure sufficient to assure flow of the fluid through the system, which depends on the depth of the channels of course, but without the required additional pressure to break up the bedrock at the maximum depth. In addition, in a sealed environment, there are minimal pressure losses caused by seepage outside the closed loop (a problem prevalent when the bedrock is fractured), and also very high assist from the fluids going in the opposite direction in the flow loop. Consequently, very low fluid pressures are required for operation and the infrastructure for generating the pressures needed at even deeper depths already exists.

In another advantage, unlike fracking, an installation according to the present invention is a closed circuit which doesn't suffer losses of the heat transfer fluid, and may allow for the use of high performance heat transfer fluids. The use of heat transfer fluids with higher performance than water may also include a further handling advantage in having the boiling point of said fluid at a temperature other than 100° C. In one case, higher efficiency would be having the boiling point at lower temperature so we don't need to go as deep. These include for example the Kalina cycle. In another case, higher efficiency may mean having a higher boiling point than water, in order to transport the heat without vaporizing.

The invention may be summarized as having the following feature sets:

1. A geothermal installation for collecting heat for the generation of electricity, the installation including a fluid transport system comprising at least one fluid injection bore extending from a thermoelectric generator located at or near the Earth's surface to a depth below the Earth's surface sufficient such that energy collected is sufficient to produce electricity, in particular a depth of at least 500 m, preferably at least 1500 m, and more preferably at least 3000 m, the at least one fluid injection bore connected at the said depth, respectively to a plurality of micro-tunnels which extend either
   (a) outwardly substantially horizontally in an essentially horizontal plane passing through the said depth,
   (b) diagonally downwardly from an essentially horizontal plane passing through the said depth, or
   (c) vertically downwardly from horizontally laid out collecting tunnels formed in the essentially horizontal plane, the collecting tunnels and/or micro-tunnels connected with at least one fluid return bore which return a heat transfer fluid to the thermoelectric generator, the fluid transport system adapted for the flow therethrough to and from the thermoelectric generator of the heat transfer fluid.
2. The geothermal installation of feature set 1, wherein the injection bores are lined by piping inserted therein and preferably sealingly connected to the micro-tunnels and to fluid return bores.
3. The geothermal installation of feature set 1, wherein the micro-tunnels are defined by a central tunnel having at least one narrow cut-out extending from the central tunnel along a cut-out plane extending in a radial direction, the micro-tunnels adapted for the flow therethrough of a heat transfer fluid.
4. The geothermal installation of feature set 3, wherein at least one narrow cut-out has a progressively narrowing, typically stepped width defined perpendicular to the radially extending cut-out plane.
5. The geothermal installation of any one of the above feature sets, wherein a structure is disposed in the micro-tunnels which extends along its axial length so as to protect the micro-tunnel against shrinkage or cave-in.
6. The geothermal installation of feature set 5, wherein the structure is a pipe of a diameter that fits within the micro-tunnels.
7. The geothermal installation of feature set 5, wherein the structure protecting the micro-tunnels against shrinkage includes channels which ensure a parallel, axial circulation of the heat transfer fluid, the heat transfer fluid circulating in opposite directions along the structure.
8. The geothermal installation of feature set 7, wherein the fluid circulates within the structure.

9. The geothermal installation of feature set 7, wherein the fluid circulates outside of the structure, in direct contact with the surrounding bedrock.
10. The geothermal installation of feature set 7, wherein the fluid circulates through the structure and on the external side of the structure.
11. The geothermal installation of any one of the above feature sets, wherein the circulation is nested.
12. The geothermal installation of any one of the above feature sets, wherein the circulation is co-axial.
13. The geothermal installation of any one of the above feature sets, wherein the heat transfer fluid circulates in a closed loop through the micro-tunnels.
14. The geothermal installation of any one of feature sets 5 to 13, wherein an insulation is provided in the structure between the central hole and the external side of said structure.
15. The geothermal installation of any one of feature sets 5 to 14, wherein the structure protecting the micro-tunnels against shrinkage is made of a chain of abutted rigid elements such as piping segments, such rigid elements being tightly connected to each other in order to ensure the circulation of the heat transfer fluid with minimum leakage.
16. The geothermal installation of any one of feature sets 5 to 15, wherein the structure protecting the micro-tunnels against shrinkage is made at least in part out of the rubble extracted when drilling the micro-tunnels.
17. The geothermal installation of any one of feature sets 5 to 16, wherein the structure includes projecting fins.
18. The geothermal installation of any one of feature sets 5 to 17, wherein the fins project radially from the structure.
19. The geothermal installation of any one of feature sets 5 to 18, wherein the fins generate a turbulent flow of the heat transfer fluid, enhancing the heat transfer performance.
20. The geothermal installation of any of the preceding feature sets, where the micro-tunnels are formed at a sufficient depth such that the surrounding bedrock temperature is above 100° C., preferably above 120° C., more preferably above 150° C.
21. The geothermal installation of any of the preceding feature sets, where the heat harvested by the micro-tunnels is collected in a heat exchanger, the heat exchanger feeding the collected heat to an electricity generator or to a distribution network for heating buildings or installations on the Earth's surface.
22. The geothermal installation of the preceding feature set, wherein part of the energy collected that is not used for the production of electricity is used for heating buildings or installations on the Earth's surface.
23. The geothermal installation of any of the preceding feature sets, where during times of the day when the power demand is lower in the distribution network, at least a portion of the extra power available is used for further drilling and installation of further exchange channels in the bedrock, progressively increasing the size of the installation.
24. A method of generating electricity using the geothermal installation of feature set 1, the method including the steps of:
    a. using a pump which is optionally part of the thermoelectric generator, injecting the heat transfer fluid into the at least one fluid injection bore extending to the said depth;
    b. via the micro-tunnels, and the optional arrays, distributing the heat transfer fluid through the bedrock to absorb heat stored therein; and
    c. via the at least one fluid return bore, returning heated heat transfer fluid to the thermoelectric generator, thereby enabling the thermoelectric generator to generate electricity from a temperature difference between the injected heat transfer fluid and the heated heat transfer fluid.

As will be appreciated by skilled artisans, the present invention may be embodied as a system, a device, or a method.

Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements such as those described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Additional features and functionality of the invention are described in the claims appended hereto and/or in the abstract. Such claims and/or abstract are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application. PUBLICATION BIBLIOGRAPHY—the contents of the below cited references are incorporated herein by reference in their entirety and relied upon:

Hirschberg, Stefan; Wiemer, Stefan; Burgherr, Peter (Eds.) (2015): Energy from the earth. Deep geothermal as a resource for the future? Zürich: VDF Hochschulverlag an der ETH Zürich (TA-SWISS (Series), 62/2015.

What is claimed is:

1. A geothermal installation for collecting heat, the installation including a fluid transport system comprising at least one fluid injection passage extending from a ground-level facility including a pumping station located at the Earth's surface to a depth below the Earth's surface such that energy collected can be applied usefully, the at least one fluid injection passage connected at said depth, respectively to an array of heat collector micro-tunnels that are adapted to allow a heat transfer fluid to circulate therein, and which:
    a) extend outwardly substantially horizontally in an essentially horizontal plane drilled and located in bedrock and passing through said depth,
    b) extend diagonally downwardly from an essentially horizontal plane drilled and located in bedrock and passing through said depth, or
    c) extend vertically downwardly from horizontally laid out collecting tunnels drilled and located in bedrock and formed in the essentially horizontal plane, wherein the micro- tunnels are connected with at least one fluid return passage which is adapted to return the heat transfer fluid or another heat transfer fluid to the facility, the fluid transport system adapted for the flow of the heat transfer fluid or the another heat transfer fluid therethrough to and from the facility.

2. The geothermal installation of claim 1, wherein the collecting tunnels and/or micro-tunnels are not lined by heat conducting layers thereby assuring direct contact between the heat exchanger fluid and surrounding material, into which the at least one fluid injection passage was formed.

3. The geothermal installation of claim 1, wherein the at least one fluid injection passage is lined by piping inserted therein.

4. The geothermal installation of claim 1, wherein structures-area structure is disposed in the micro-tunnels which extends along its axial length so as to protect the micro tunnel against shrinkage or cave-in.

5. The geothermal installation of claim 4, wherein the structure is a heat conducting layer.

6. The geothermal installation of claim 4, wherein the structure protecting the micro-tunnels against shrinkage includes channels which ensure a parallel, axial circulation of the heat transfer fluid, the heat transfer fluid circulating in opposite directions along the structure.

7. The geothermal installation of claim 6, wherein the heat transfer fluid circulates within the structure.

8. The geothermal installation of claim 6, wherein the heat transfer fluid circulates outside of the structure, in direct contact with surrounding bedrock.

9. The geothermal installation of claim 6, wherein the heat transfer fluid circulates through the structure and on the external side of the structure.

10. The geothermal installation of claim 4, wherein the structure protecting the micro-tunnels against shrinkage is made of a series of heat conducting layers.

11. The geothermal installation of claim 10, wherein the series of heat conducting layers are abutted.

12. The geothermal installation of claim 10, wherein the series of heat conducting layers comprise piping segments.

13. The geothermal installation of claim 10, wherein the series of heat conducting layers are tightly connected to each other in order to ensure the circulation of the heat transfer fluid with minimum leakage.

14. The geothermal installation of claim 4, wherein the structure protecting the micro-tunnels against shrinkage is made at least in part out of the rubble extracted when drilling the micro-tunnels.

15. The geothermal installation of claim 4, wherein the structure includes projecting fins.

16. The geothermal installation of claim 4, wherein the fins project radially from the structure.

17. The geothermal installation of claim 4, wherein the fins generate a turbulent flow of the heat transfer fluid, enhancing the heat transfer performance.

18. The geothermal installation of claim 1, where the micro-tunnels are formed at a sufficient depth such that the surrounding bedrock temperature is above 100° C.

19. The geothermal installation of claim 1, wherein the heat is used for generating electricity and wherein the heat harvested by the micro-tunnels is collected in a heat exchanger, the heat exchanger feeding the collected heat to an electricity generator or to a distribution network for heating buildings or installations on the Earth's surface.

20. The geothermal installation of claim 19, wherein part of the energy collected that is not used for the production of electricity is used for heating buildings or installations on the Earth's surface.

21. The geothermal installation of claim 19, wherein during times of the day when electricity demand is lower in the distribution network, at least a portion of the available electricity is used for further drilling and installation of further micro-tunnels in the bedrock, progressively increasing the size of the installation.

22. A method of harvesting heat using the geothermal installation, the method including the steps of:
    a) using a pump injecting a heat transfer fluid into at least one fluid injection passage extending to a given depth:
    b) via micro-tunnels drilled and located in bedrock, distributing the heat transfer fluid through the bedrock to absorb heat stored therein; and
    c) via the at least one fluid return passage, returning the heated heat transfer fluid to a thermoelectric generator, thereby enabling the thermoelectric generator to generate electricity from a temperature difference between the injected heat transfer fluid and the heated heat transfer fluid.

23. The geothermal installation of claim 1 wherein the at least one fluid return passage is disposed coaxially to the at least one fluid injection passage.

\* \* \* \* \*